(12) United States Patent
Cacucci et al.

(10) Patent No.: US 7,125,069 B2
(45) Date of Patent: Oct. 24, 2006

(54) VEHICLE SAFETY SYSTEM

(75) Inventors: Giuliano Cacucci, Carmel, IN (US); Steve Johnson, Fishers, IN (US); Brian Hood, Zionsville, IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 0 days.

(21) Appl. No.: 10/713,141

(22) Filed: Nov. 13, 2003

(65) Prior Publication Data

US 2004/0212217 A1 Oct. 28, 2004

Related U.S. Application Data

(60) Provisional application No. 60/426,313, filed on Nov. 14, 2002.

(51) Int. Cl.
*B60R 21/02* (2006.01)

(52) U.S. Cl. .............................. 296/190.03; 280/730.2; 280/748; 280/271

(58) Field of Classification Search ................. 296/152, 296/190.03; 280/730.2, 749, 748; 180/271
See application file for complete search history.

(56) References Cited

U.S. PATENT DOCUMENTS

| | | | | |
|---|---|---|---|---|
| 2,710,058 A | * | 6/1955 | Gronlund et al. ........... 160/103 |
| 3,650,542 A | * | 3/1972 | Shimano et al. ............ 280/749 |
| 4,215,895 A | * | 8/1980 | Phillips ....................... 296/202 |
| 5,290,086 A | * | 3/1994 | Tucker ........................ 296/152 |
| 5,322,322 A | | 6/1994 | Bark et al. |
| 5,462,308 A | * | 10/1995 | Seki et al. ................... 280/749 |
| 5,480,181 A | | 1/1996 | Bark et al. |
| 5,482,104 A | * | 1/1996 | Lichy ....................... 160/273.1 |
| 5,588,672 A | * | 12/1996 | Karlow et al. ............ 280/730.2 |
| 5,660,414 A | * | 8/1997 | Karlow et al. .............. 280/749 |
| 5,707,075 A | * | 1/1998 | Kraft et al. .............. 280/730.2 |
| 6,135,497 A | * | 10/2000 | Sutherland et al. ......... 280/749 |
| 6,212,455 B1 | | 4/2001 | Weaver |
| 6,292,759 B1 | | 9/2001 | Schiffmann |
| 6,363,306 B1 | | 3/2002 | Palmertz et al. |
| 6,371,512 B1 | | 4/2002 | Asano et al. |
| 6,530,448 B1 | * | 3/2003 | Abels et al. ................. 180/271 |
| 6,584,388 B1 | | 6/2003 | Schubert et al. |
| 6,600,985 B1 | | 7/2003 | Weaver et al. |
| 6,672,619 B1 | | 1/2004 | Ennerdal et al. |
| 2001/0017462 A1 | * | 8/2001 | Abels et al. ................. 280/748 |
| 2001/0033073 A1 | * | 10/2001 | Hammond et al. ....... 280/730.2 |
| 2002/0096864 A1 | * | 7/2002 | Asano et al. ............. 280/730.2 |

OTHER PUBLICATIONS

"Restraining Order", Giuliano Cacucci & Brian Hood, Design & Product Development, iVT International, Jan. 2002, pp. 54-57.

* cited by examiner

*Primary Examiner*—Joseph D. Pape
(74) *Attorney, Agent, or Firm*—Barnes & Thornburg LLP

(57) ABSTRACT

A vehicle safety system for impeding an occupant's egress from a vehicle is provided. A barrier is deployed, either manually or automatically, to cover at least a portion of the vehicle's exit in order to impede an occupant from egressing through the exit. The barrier may be a passive barrier or a reactive barrier. The barrier may also be a combination of a passive and a reactive barrier or the combination of several reactive barriers.

12 Claims, 8 Drawing Sheets

VEHICLE SAFETY SYSTEM

This application claims the benefit of and priority to U.S. provisional patent application No. 60/426,313, filed 14 Nov. 2002.

BACKGROUND OF THE INVENTION

The present invention relates to vehicle safety systems and more specifically to an apparatus for protecting an occupant of a vehicle during abnormal operating conditions.

Various safety systems are used to protect occupants of vehicles. For example, seat belt and airbag systems may be used to protect vehicle occupants. In the case of a lift truck, one suitable seat belt system, for example, might comprise an automatic locking retractor and a belt buckle assembly as described in commonly owned U.S. Pat. No. 4,832,410 to Bougher, the disclosure of which is now incorporated herein by reference. Lift trucks may also be equipped with a Falling Object Protection System (FOPS), which comprises a sectioned roof resting on side supports, thereby creating a cab or cockpit in which the occupant is generally protected from falling objects. It has been found that during lift truck tip-over conditions, an occupant may try to exit the cockpit of the vehicle, or may be ejected from the cockpit, prior to completion of the tip over. What is desired is a safety system that blocks the exit pathway and contains the occupant substantially within the cab of the lift truck or other vehicle.

A vehicle safety system for impeding the egress of an occupant of a vehicle is provided. Such a vehicle safety system comprises one or more safety barriers mounted to one or more exits and configured to move between a stowed position, allowing an occupant to egress the vehicle through the one or more exits, and a deployed position. In the deployed position, the barrier(s) cover at least a portion of the exit(s) to impede occupant egress through the exit(s). One such safety barrier might be a passive barrier such as a net, or plastic sheet. Such a passive barrier affords the occupant the visibility necessary to operate the vehicle. Therefore, the vehicle may be operated with the passive barrier in the deployed position continuously. The vehicle may be equipped with a FOPS or other frame that defines the exit(s) in order to mount and/or guide the passive barrier as it is moved between the stowed positions and the deployed positions. The passive safety barrier may be deployed, moved from the stowed to the deployed position, and/or stowed, moved from the deployed to the stowed position, manually by the occupant. The occupant may manually deploy or stow the safety barrier by applying direct pressure to the passive safety barrier to move it. The occupant may also actuate one or more mechanical devises, such as for example a motor or hand crank or other devices described herein or known in the art, to deploy or stow the safety barrier. The safety system may further comprise a control system configured to sense one or more parameters or the occurrence of one or more defined events in order to automatically deploy or stow the passive barrier. Automatic deployment or stowing of the passive barrier may also be realized by other mechanical devices, such as for example a retractor biased to stow or deploy the safety barrier. The safety system may be equipped with one or more locking mechanisms to lock the passive safety barrier in the deployed position. These locking mechanisms may be any suitable mechanical, electrical, or electro-mechanical device, some representative examples of which are described herein below. The locking mechanisms may manually be actuated by the occupant, or automatically actuated by the control system. In the alternative, the safety barrier may be a reactive safety barrier, such as for example, an inflatable member. The inflatable member may be a tube, or a curtain comprising generally vertical and generally horizontal bladders, or a combination of a tube and a curtain. The reactive safety member also has stowed and deployed positions. The reactive safety member may be deployed manually by the occupant, for example, by pushing a button or actuating a switch, or automatically by the control system. The illustrative inflatable safety member(s) are deployed by filling them with fluid in order to inflate them, thereby causing them to cover at least a portion of the exit(s) to impede egress through the exit. The construction of the inflatable safety barriers may allow for the retention of the fluid for a desired length of time. The reactive safety barriers may be combined with each other and/or with a passive safety barrier. So too, reactive and/or passive safety barriers may be installed, alone or in combination, on any one, or every exit of the vehicle. The features of the safety barriers described herein may be used alone or in combination.

Features of the invention will become apparent to those skilled in the art upon consideration of the following detailed description of the preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
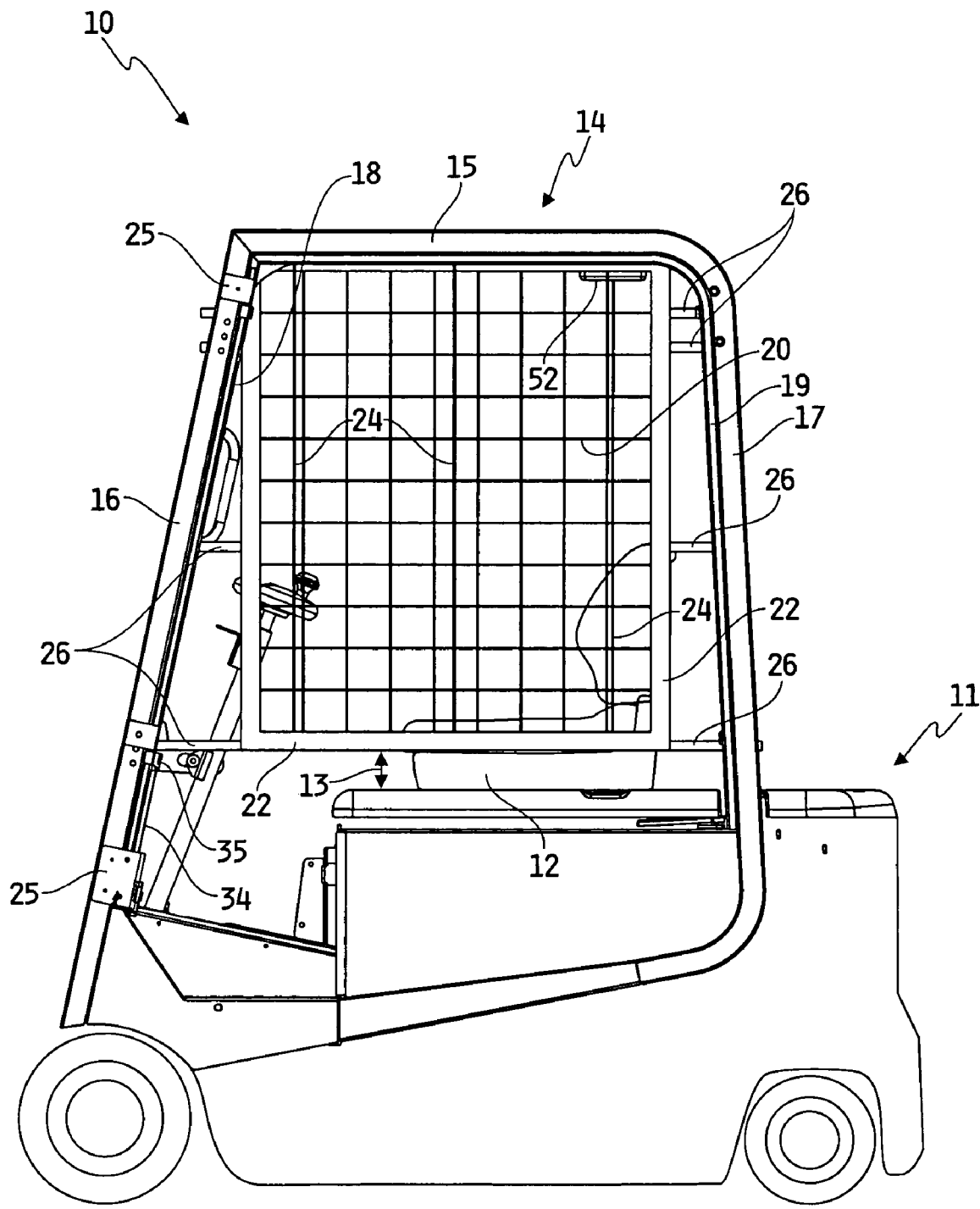
FIG. 1 shows a side view of a vehicle equipped with an illustrative embodiment of a passive safety system in a deployed position.

FIG. 1 depicts an illustrative embodiment of a vehicle safety system 10 comprising a safety barrier 20. Illustratively, the safety barrier is a passive barrier, illustratively a net, which is generally rectangular in shape and is mounted to the vehicle, for example to a falling object protection system (FOPS) 14 of a lift truck 11. The FOPS comprises a pair of spaced-apart front supports 16, a pair of spaced-apart back supports 17 and a pair of spaced-apart top members 15 sandwiched between the side supports 16, 17. Illustratively, a top side of passive barrier(s) 20 may be attached to one or both of the top members 15 by any suitable fastening means, such as for example and without limitation grommets and fasteners, nuts and bolts, tacks, screws, cement, ties, webbing, loops and hooks, rivets and the like. As shown in FIG. 1, passive barrier 20 is attached to or mounted to the top member 15 on the left side of truck 11. It will be appreciated that passive barrier 20 may be attached to the right side of truck 11 in addition to, i.e., one net 20 on each side of the truck 11, or in lieu of being attached to the left side. The passive barrier(s) 20 may be any suitable commercially available netting made of any suitable material such as for example without limitation nylon, rope, webbing, fabric and the like, may be knotted at each junction or woven together rather than knotted, and may have a border 22 of for example webbing. One suitable net is for example and without limitation a Carron net. The passive barrier 20 further comprises one or more tethers 26 spaced apart along each of the front side and back side of passive barrier 20. One end of each tether 26 may be attached to the respective side of passive barrier 20 by for example and without limitation stitching, melting, tacks, glue, rivets or other suitable means including any combination thereof. The other end of each tether 26 is movably, for example slidingly, connected to a guide system illustratively comprising respective front track 18 or rear track 19. Front track 18 and rear track 19 are carried by respective front support 16 and rear support 17. The upper and lower ends of the tracks 18, 19, which illustratively have a generally circular cross-section, are attached to the vehicle 11 by for example brackets 25 or other suitable means. The tracks 18, 19 and brackets 25 may be made from any suitable metallic, non-metallic, or composite material such as for example and without limitation steel, aluminum, zinc, plastic, resin, and the like using any method of manufacture suitable to the material being used. The tethers 26 may be configured to movably interact with the tracks 18, 19 by any suitable method. For example, the tethers may be fitted with annular members that thread over the tracks 18, 19 and slide up and down the tracks 18, 19. In the alternative, the tethers 26 may be fitted with a guide member (not shown) that fits inside a slot (not shown) in the tracks 18, 19 such that the member slides up and down the tracks 18, 19 within the slot, which may be, but need not be, equipped with bearings, for example. Another suitable means would be wrapping the tethers 26 around the tracks 18, 19 and looping them back to attach to themselves such that the tethers 26 themselves move up and down the tracks.

Figure 7:
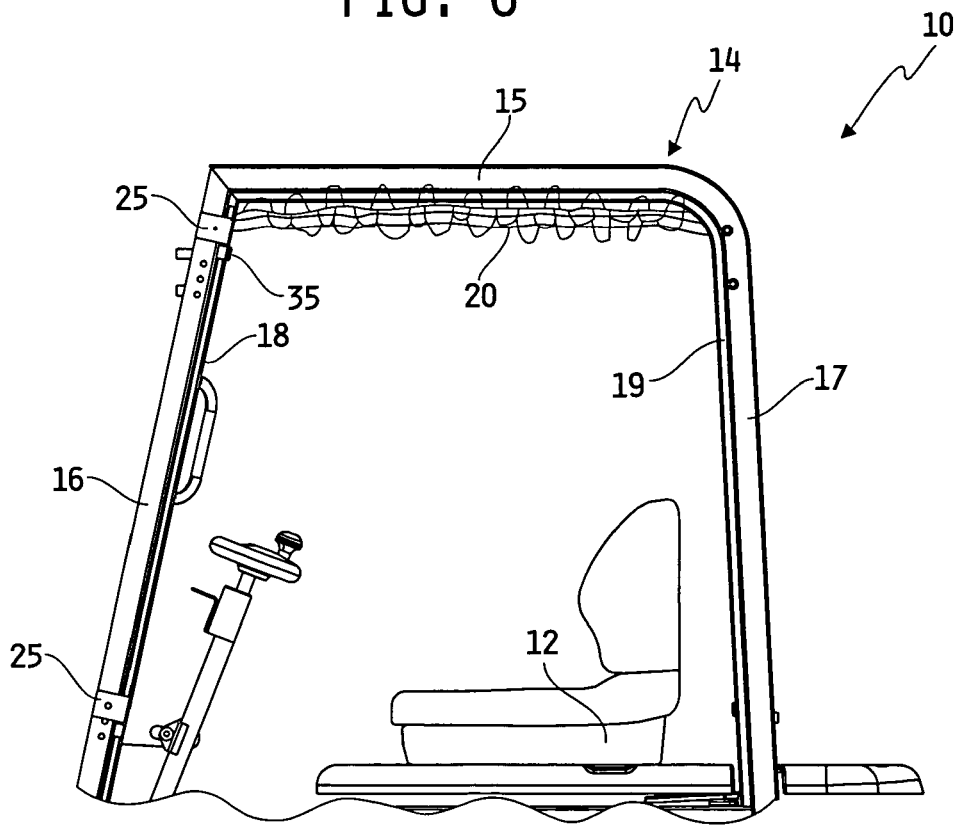
FIG. 7 shows a partial side view of any of the safety systems shown in FIGS. 1 and 4 in an illustrative stowed condition.

The passive barrier 20 has a stowed or retracted position or state wherein the bottom side of the net is raised upwardly such that it is disposed proximate to the top side of the net and the top rail 15 (FIG. 7) and such that the vehicle's exit is substantially open or uncovered by the barrier 20 so that an occupant may exit or egress the vehicle substantially unimpeded by the barrier. As used herein, egress and exit mean the act of the occupant going or coming out of the vehicle 11, either under the occupant's own power as for example when the occupant steps or jumps out of the vehicle, or because of the occurrence of some event such as for example when the vehicle tips over or impacts an object and the occupant falls or is thrown out of the vehicle. The barrier 20 also has a deployed position or state wherein the bottom side of the net is extended or lowered out of the stowed position, which illustratively in FIG. 1 is downwardly away from the top side of the net 20, such that the barrier 20, covers, extends across or spans at least a portion of the vehicle's exit in order to impede the occupant from exiting or egressing the vehicle through that exit. Thus there is a range of deployed positions ranging from just out of the stowed position to the fully extended deployed position. As will be explained, the barrier 20 may be extended from top to bottom, from bottom to top, from side to side, or from both top to bottom and bottom to top. It will be appreciated that a person, such as an occupant 90 (FIG. 5) may physically move the passive barrier 20 to the deployed position and back therefrom to the stowed position. In addition, an occupant 90 may manually lock the passive barrier 20 in the fully deployed position, using any suitable locking means such as by engaging a hook on the passive barrier 20 with an eye anchored on the vehicle, or engaging a latch, or engaging a mechanism within or on the tracks 18, 19 to block movement of the tethers 26, or by physically engaging or actuating any other suitable locking mechanism. As will be explained, the passive barrier 20 may also be locked through automatic means. Locking the passive barrier 20 illustratively may take the slack, if any, out of the deployed passive barrier 20 and/or prevent the passive barrier 20 from retracting from the fully deployed position. As long as the passive barrier 20 is not in the fully stowed position, it will impede the egress of an occupant 90 from the truck 11 as will be described below.

Figure 2:
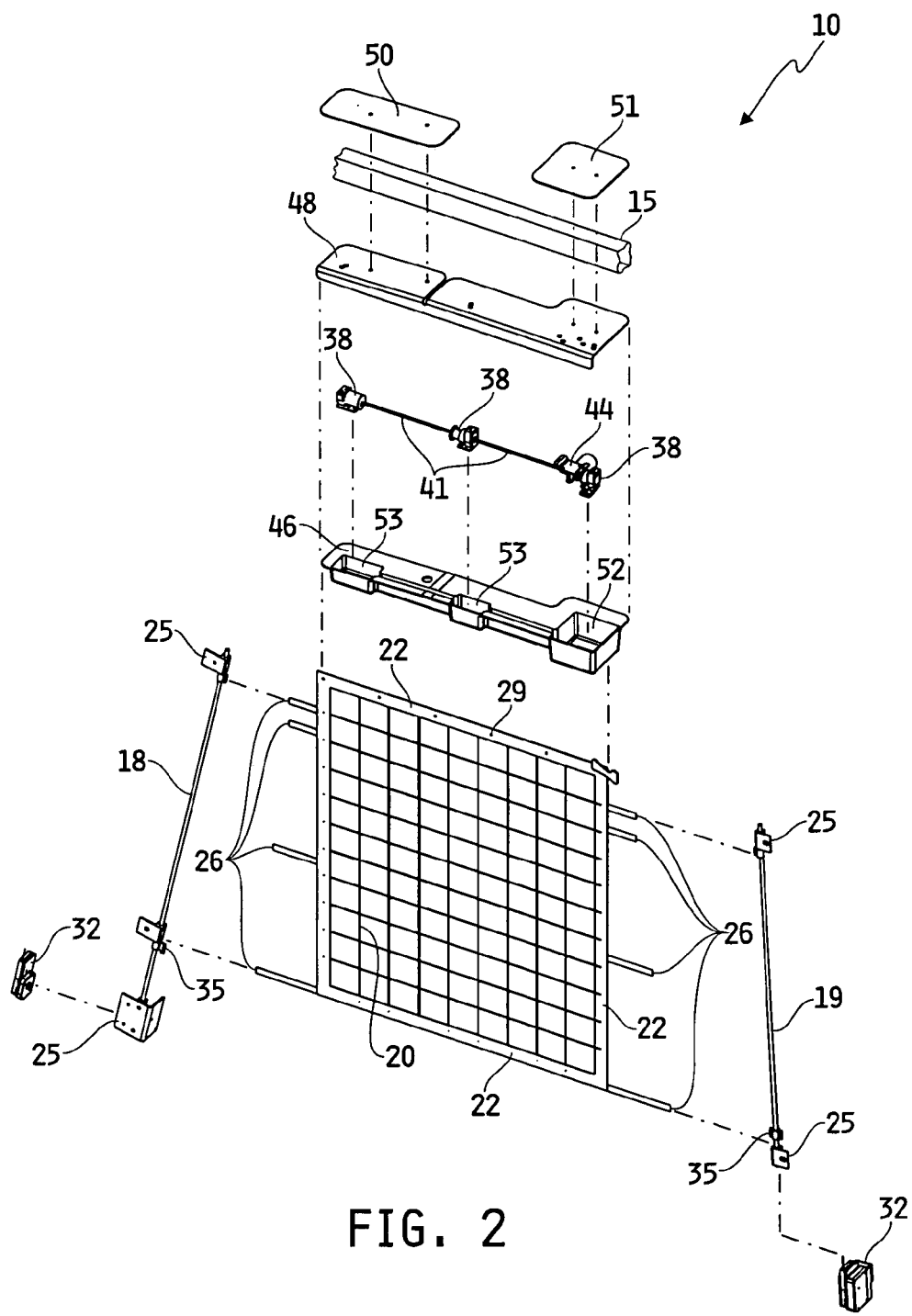
FIG. 2 is an exploded view of the safety system depicted in FIG. 1.

The passive barrier 20 may be automatically or manually deployed, retracted and/or locked through any combination of electrical, mechanical or electro-mechanical devices. For example, referring to FIG. 2, the safety system 10 may further comprise one or more spools 38 and at least one motor 44. Illustratively, motor 44 drives shaft 41 which in turn drives spools 38 carried by shaft 41. The spools 38 and motor 44 are mounted to top rail 15 as by example through cooperating mounting plate 48 and guard mounting plates 50, 51. Any suitable connector, such as for example and without limitation nuts and bolts, nails, rivets, and the like may be used to mount the spools 38 and motor 44 and plates 48, 50, 51 to the top rail 15. For example, a fastener could be threaded through brackets on the spools 38 and/or motor 44, and through apertures in mounting plates 48, 50, 51 and top rail 15. Alternatively, the fasteners could pass to the outsides of top rail 15 rather than penetrating the rail 15. Cover 46 may also be attached to mounting plate 48 and/or top rail 15, and is configured to house the motor 44 and spools 38 in respective recesses 52 (FIGS. 1 and 2) and 53 (FIG. 2) formed in cover 46. Each wire 24 (FIG. 1) has one end connected to respective spool 38 and another end attached to the bottom of net 20, for example to the lowest most tether 26. As motor 44 drives shaft 41 and spools 38, wires 24 are wound about the spools to retract or raise the passive barrier 20 upwardly toward the top rail 15 into the stowed position. Motor 44 can be disengaged to allow the passive barrier 20 to extend or lower downwardly away from the top rail 15 into the deployed position. Such extension may be unaided or aided by either the occupant 90 or by one or more retractors 32 (FIG. 2). Once deployed, the passive barrier 20 may be locked as noted above and as will be explained in greater detail below. It will be appreciated that the net manually or automatically may be moved out of the fully stowed position into any position intermediate to the fully stowed and the fully deployed positions, and manually or automatically may be locked in any such deployed position. As noted above, once out of the fully stowed position, the net 20, whether locked or not, will impede the egress of any occupant 90 from the vehicle 11.

Illustratively, the optional retractors 32 may be configured with deployment cables 34 (FIG. 1) which are attached to cable brackets 35, which in turn are attached to passive barrier 20. The cables 34 could also be attached directly to the lowermost tether 26. Each retractor 32 may be biased, for example by a flat wound spring or other biasing device, to retract the cables 34 to pull the passive barrier 20 downwardly into the deployed position when the motor 44 is configured to aid or allow the spools 38 to pay out wire 24. The wires 24 and cables 34 may alternatively be ribbon, web belt, rope, wire, cable, or other suitable retraction/extension member. In such a system 10 configured with retractors 32, either the occupant or the motor may act against the bias of the retractors 32 to raise the passive barrier 20 from the deployed and unlocked condition to the fully stowed position, or any intermediate position, as described above. It will be appreciated that the roles and positions of retractors 32 and motor 44 may be reversed such that motor 44 and spools 38 are positioned at the bottom of supports 16, 17 in order to pull the passive barrier 20 into the deployed position against the bias of the retractors 32, which are attached to top rail 15 and are biased to raise the passive barrier 20 into the up and stowed position. So too, the system 10 could be equipped with one motor 44 and one retractor 32 at the top and one motor 44 and one retractor 32 at the bottom. Other combinations are possible as well, such as for example having one or more motors 44 at both the top and the bottom, or having one or more retractors 32 at both the top and the bottom.

It is generally desirable for the safety barriers described herein, including passive barrier 20, to be deployed downwardly to a position generally at or below the seat 12 such that the distance 13, 13', 13", 13'" between the bottom of the passive barrier 20 and the sitting surface of the seat is minimized or eliminated to better impede occupant 90 egress or ejection from the cab. On the one hand, as noted above, the passive barrier 20 may be fully deployed by locking the passive barrier 20 in the fully deployed position without the use of any retractor(s) 32. On the other hand, the use of retractor(s) 32 may aid in achieving this degree of deployment without the need for locking the passive barrier 20 thereby impeding egress while still allowing the occupant 90 to overcome the retractor bias and raise/lower the passive barrier 20 from the deployed and unlocked position. In any event, during certain defined conditions, such as a tip-over condition, it is desirable, though not necessary, that the net 20 not only be in the deployed position, to some degree or another, but also in the locked condition, which may be accomplished through control devices as will be described.

It will be appreciated that the net 20 may be mounted on the vehicle 11 in configurations alternate to the above description. For example, the passive barrier 20 may be mounted toward the bottom of the vehicle 11 such that the passive barrier 20 has a stowed position wherein the passive barrier 20 is lowered away from top rail 15 and a deployed position wherein the net is raised upwardly toward top rail 15. In such a case, the occupant, the retractors 32 and/or the motor 44, or other suitable means, as determined by mounting location, may urge the passive barrier 20 upwardly to the alternate deployed position, or may urge the passive barrier 20 downwardly to the alternate stowed position, again as desired and as determined by mounting location of the retractor(s) 32 and motor (44). The passive barrier 20 could also be mounted on either support 16, 17 and deployed laterally across between the supports 16, 17 much like a curtain, with the tethers 26 interacting with a track carried by top rail 15. In such a case, the retractor(s) 32 and motor(s) 44 may be mounted as desired on supports 16, 17 to deploy and/or stow the passive barrier 20, or a person could deploy and stow and lock the passive barrier 20 directly and as desired. Those skilled in the art will appreciate that two or more nets 20 may be used per side of a vehicle and deployed toward each other using the structure described above. For example, a first net could deploy from the top to the bottom of the vehicle 11 while second net could deploy from the bottom to the top moving toward the downwardly moving first net. So too, a first net could be mounted to and configured to deploy away from one side support 16 toward second net mounted to and configured to move away from the opposite side 17 and toward side support 16.

As noted above, a passive barrier 20, or a plurality of barriers 20, may be mounted and operated as described above on either or both sides of the vehicle 11. No matter if the barrier(s) or net(s) 20 is/are to be deployed from top to bottom, bottom to top, side to side, obliquely, or any combination thereof, the system 10 may be configured with opposing retractors 32 to both deploy and stow the passive barrier(s) 20, with opposing motors 44 to both deploy and stow the net, with any other combination and permutation of cooperating and opposing motors and retractors, alone or in combination with each other, with an occupant 90 manually moving the net(s) 20, or with other suitable devices to deploy and stow net(s) 20, all of which fall within the scope of the invention and the knowledge of those skilled in the art.

In operation, the passive barrier(s) 20 is deployed as described above and at any suitable or desired time. For example, the passive barrier(s) 20 may be deployed after the occupant 90 mounts the vehicle 10, and may thereafter be locked in the desired deployed position at the desired time, using any suitable mechanical stop, some illustrative examples of which have been described above, or any suitable electrical or electromechanical stops known to those skilled in the art. For example, the retractor(s) 32 may be automatic locking retractors, the motor 44 may be braked, and/or limit switches and solenoids may be employed to lock the various components as directed by the occupant 90 or by an optional control system 130. So too, the occupant may mount the vehicle and manually pull the passive barrier(s) 20 into the desired deployed position(s) and then lock the net(s) as described above. A combination of manual occupant and control system actuation may also be used to deploy and/or lock the passive barrier(s) 20. In the deployed position, the net(s) 20 will during the operation of the vehicle provide generally continuous and passive containment of the occupant 90 generally within the confines of the cab as generally defined by the FOPS and the passive barrier 20, or barriers if both sides of the vehicle 11 are configured with a net 20 or if more than one net 20 is used on one or both sides of the vehicle 11. In other words, the occupant 90 is impeded from either falling out of the cab or jumping out of the cab or otherwise egressing the vehicle 11 when the passive barrier 20 is locked in the deployed position, and possibly also when in the deployed but unlocked position. The passive barrier(s) 20 need not be fully deployed, nor even locked to inhibit occupant egress. It will be appreciated that while the passive barrier 20 is deployed, whether fully deployed or not, the occupant 90 still has visibility through the passive barrier 20, thus allowing for continuous and passive deployment during the normal operation of the vehicle. The net 20 may be configured to provide visibility in accordance with any applicable local, state, or federal safety regulations and/or laws. A portion of the net may even be cut out to provide a window of desired shape and size. Such a window, for example, may be devoid of structure or may be equipped with for example a piece of clear material, such as plastic. The barrier or net 20 may even be replaced wholly by a solid but transparent barrier, such as for example a sheet of plastic.

As just described, the passive barrier 20 manually may be deployed and/or locked by a person physically moving it to the deployed position and actuating any suitable locking means, or by a person actuating, activating or deactivating, for example and without limitation a switch, mechanical devices such as motor(s) and/or retractor(s). The passive barrier also may be deployed and or locked automatically. For example, the retractor(s) 32 may be biased to deploy the barrier(s) 20 automatically. In which case, the occupant could apply pressure to the passive barrier(s) 20 to overcome the bias and enter the vehicle 11. The passive barrier(s) 20 would then return to the deployed position after the occupant 90 eased the pressure. In another alternative, the safety system 10 may further comprise a control system 130 (FIGS. 5 and 8) which automatically may deploy, stow and/or lock the passive barrier(s) 20 as desired. Illustratively, such a control system automatically may deploy the passive barrier 20 at the occurrence of one or a combination of defined events or triggers, for example and without limitation: when power is applied to the vehicle 11, when an occupant 90 activates a switch, when an occupant 90 sits on the seat 12 thereby activating a solenoid, when an occupant 90 engages a seat belt and buckle (not shown), when a parking brake is released, when the vehicle 11 is put into gear, when the accelerator is depressed, when the control system 130 senses an acceleration, or when some other trigger alone or in combination with one of the above occurs. The control system may also lock the passive barrier(s) 20 in the deployed position at the occurrence of one of the above triggers, alone or in combination, or the occurrence of some other suitable trigger(s), such as for example when the control system senses a tip-over condition. For example, it may be desirable for the passive barrier(s) 20 to be deployed and locked whenever the vehicle is moving; or it may be desirable for the net to be deployed and unlocked during normal operation, thereafter locking only upon the occurrence of some defined event, such as for example a tip-over condition or when the vehicle exceeds a certain speed or incline. In such a locked condition, for example, the control system 130 may lock the retractor(s) 32 and/or the motor(s) 44 and/or actuate any other type of suitable stop (not shown) described herein or known in the art, thereby preventing the occupant 90 or any other force from raising the passive barrier 20 from the deployed position. At the occurrence of yet further defined event(s) or trigger(s), alone or in combination, the control system may then unlock and/or stow the passive barrier 20, as programmed. For example, the control system 130 may unlock the passive safety barrier 20 only when certain accelerations are no longer sensed, or no longer sensed after a defined period of time, all as defined by the logic in the control system 130, and may stow the passive barrier 20 when a switch is activated, or when the control system 130 no longer senses any acceleration and/or the parking brake is engaged.

Figure 8:
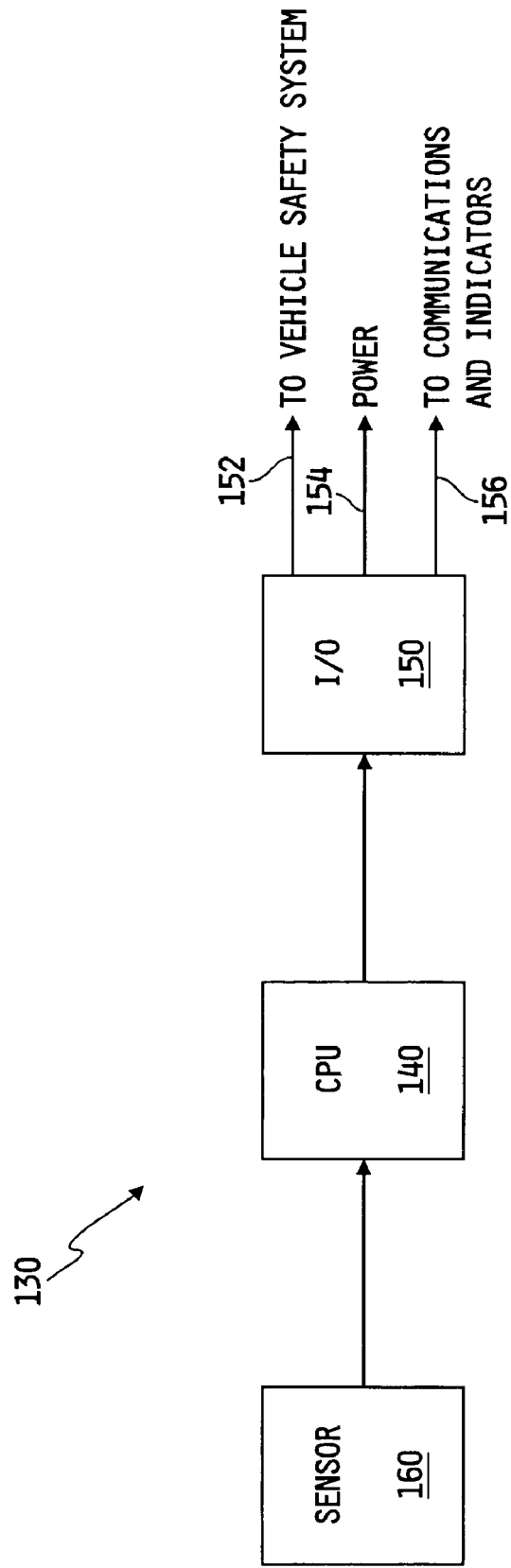
FIG. 8 is a block diagram showing an illustrative control system configurable for use with any of the illustrative safety system embodiments.

Thus, the control system 130 may receive and process input signals from any number of devices that move or lock the net(s), such as for example retractor(s) 32 and motor(s) 44, and from any number of sensors or sensor assemblies 160, and may output control signals to any number of devices that move or lock the net(s), such as for example retractor(s) 32 and motor(s) 44, to any number of sensors or sensor assemblies 160 and to any number of signal devices (for example one or more warning lights, horns or sirens). A block diagram of an illustrative control system 130 is depicted in FIG. 8 and comprises a central processing unit (CPU) 140, an input/output device, and a sensor assembly 160 comprising at least one sensor. The input/output unit 150 may input and/or output signals 152 to/from the vehicle safety system and to/from various indicators (such as warning lights) and communications devices (such as diagnostics devices and displays). The input/output unit is also connected 154 to the power source. The sensor assembly 160 may include a roll sensor to sense any number of parameters or the occurrence of any defined event to include, for example and without limitation, tip-over conditions, accelerations, inclines, velocities and the like. The sensor assembly 160 may also comprise other sensors to determine the status of the system 10, for example and without limitation, the sensor assembly may determine whether the locking means, the inflator(s), the barrier(s), the motor(s), the retractor(s) and the like are in proper working order. Examples of suitable control systems 130 and sensors 160 are described in commonly owned U.S. Pat. No. 6,212,455 to Weaver (the "'455 patent") and U.S. Pat. No. 6,600,985 to Weaver et al. (the "'985 patent"), the disclosures of which are incorporated herein by reference. It will be appreciated that other conventional control systems and sensors may be used.

Operation of the illustrative control system 130 will be now be described more specifically. The sensor 160 may monitor the occurrence of such defined events and/or such parameters as the horizontal acceleration of the vehicle 11 and/or the roll angle and rate of the vehicle relative to the horizontal plane or other defined reference. So too, the lateral acceleration of the vehicle 11, or the pitch and/or yaw angle and rate of the vehicle 11 may be measured. When any one, or combination of measured parameters and/or defined events exceed a certain defined or threshold value, which may be tailored to a particular vehicle and circumstance, the CPU 140 can send a signal 152 to solenoids, for example, in the safety system 10 to lock the retractors 32, if not already locked, and a signal 156 to indicators informing the occupant 90 of the roll condition. The system 10 may stay in a locked state for a defined lock time, and may return to an unlocked state on command, for example after a defined time, after activation of a switch, or after cycling power. Similarly, the CPU 140 may direct the passive barrier(s) 20 to be deployed or stowed based on the meeting of some criteria or trigger as discussed herein. With respect to safety systems 110, 210, 310, 410 described herein below, the control system 130 will operate in substantially the same manner as just described although in addition to or in lieu of locking the barrier net(s) 20, the CPU may send control signals 152, 156 to an inflator 60 upon sensing a tip-over or roll condition in order to direct or inject fluid into and thereby deploy the respective barrier(s) 120, 220, or any combination of 20, 120 and/or 220 as will now be described in more detail.

Figure 3:
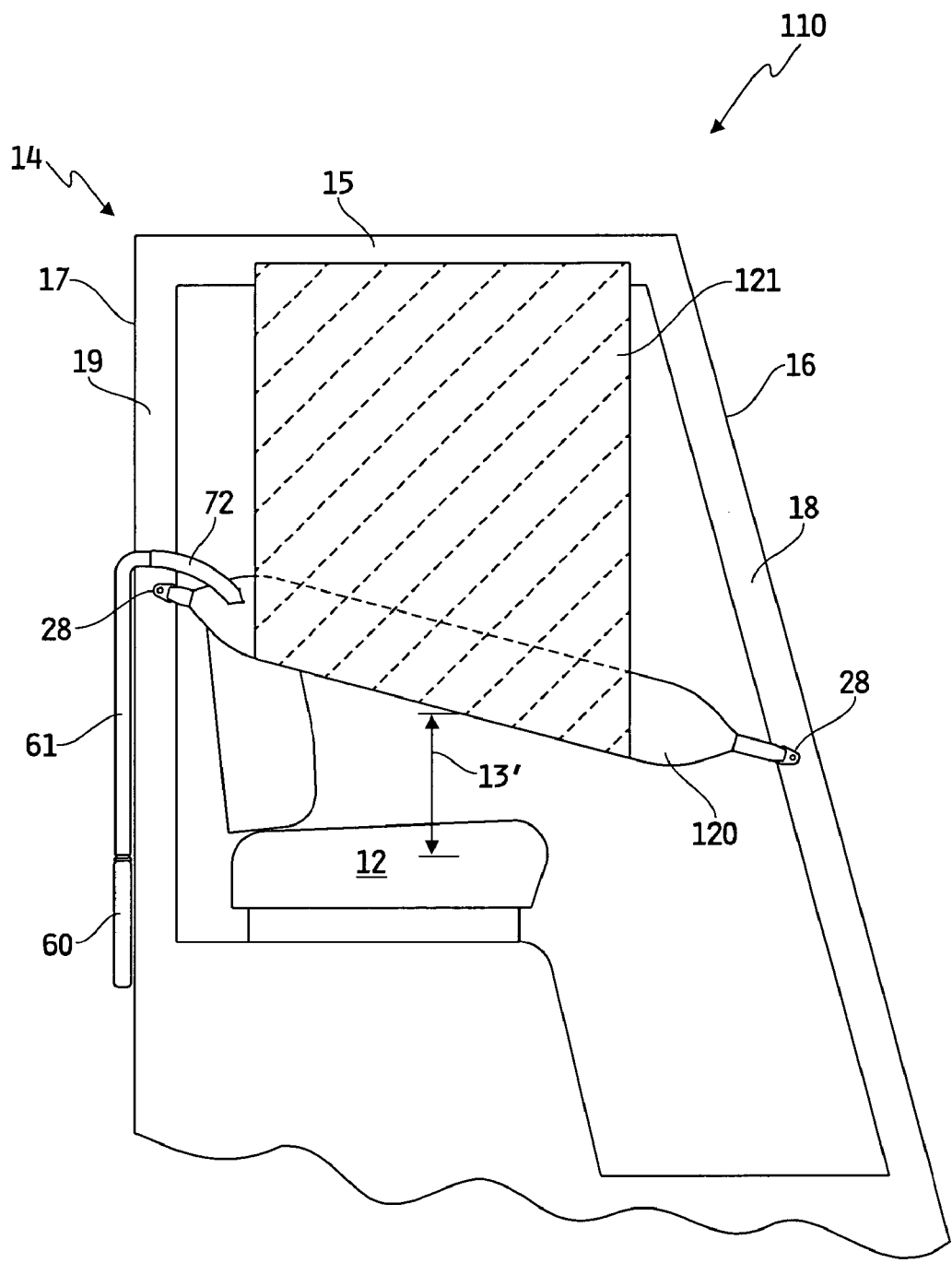
FIG. 3 shows a partial side view of an illustrative embodiment of an active safety system deployed in an exemplary lift truck.
Figure 4:
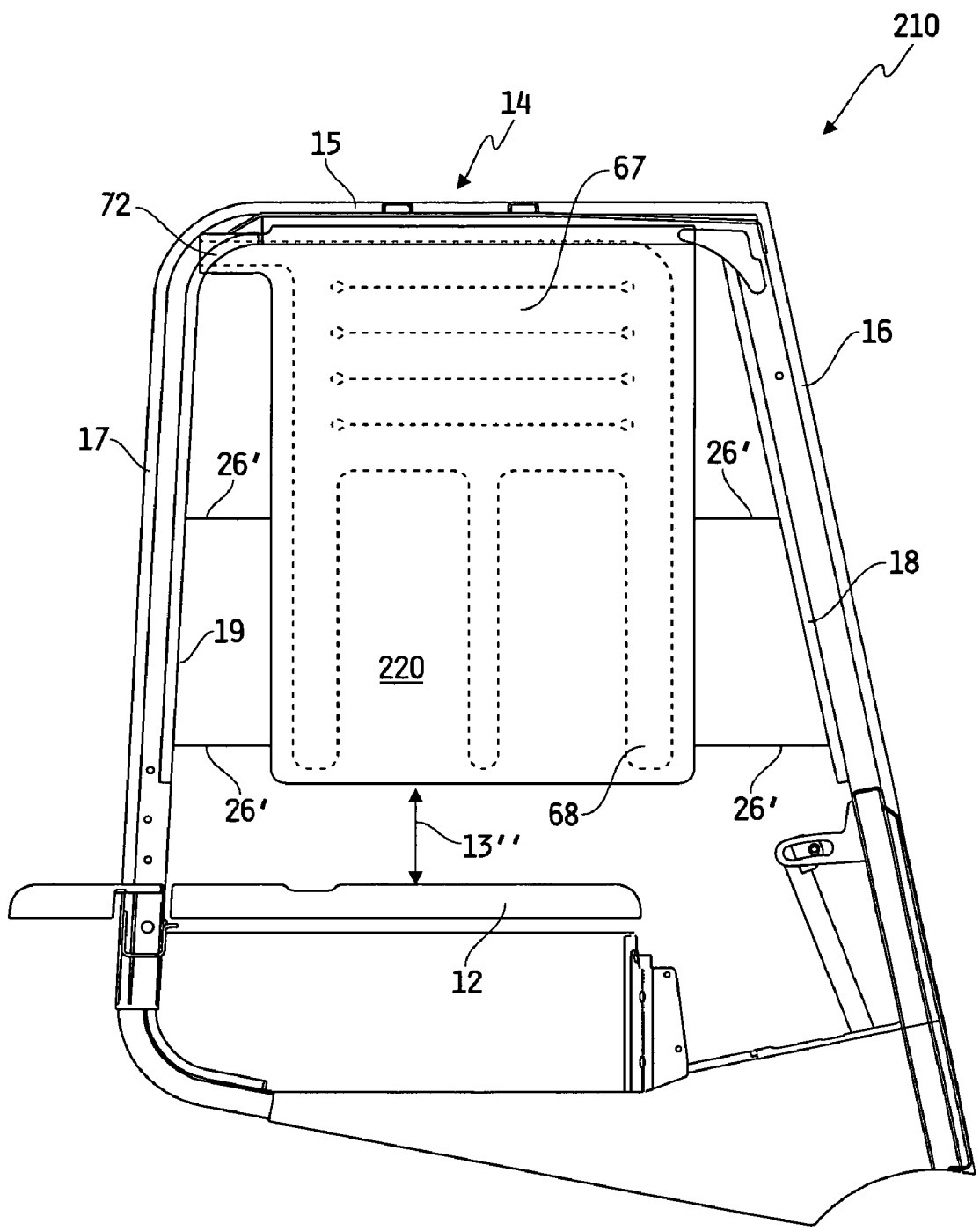
FIG. 4 shows a partial side view of another illustrative embodiment of an active safety system deployed in an exemplary lift truck.
Figure 5:
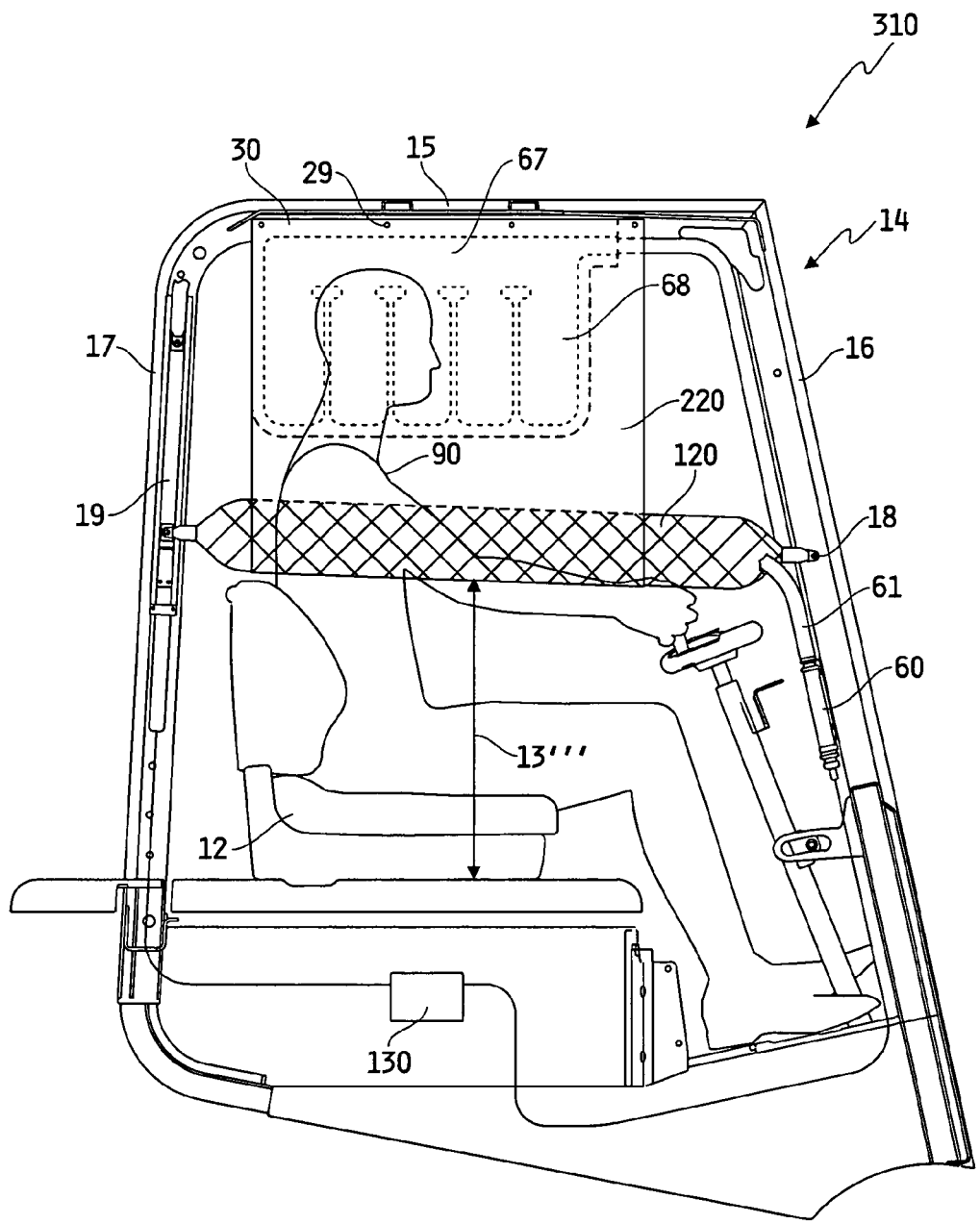
FIG. 5 shows a partial side view of yet another illustrative embodiment of an active safety system deployed in an exemplary lift truck.
Figure 6:
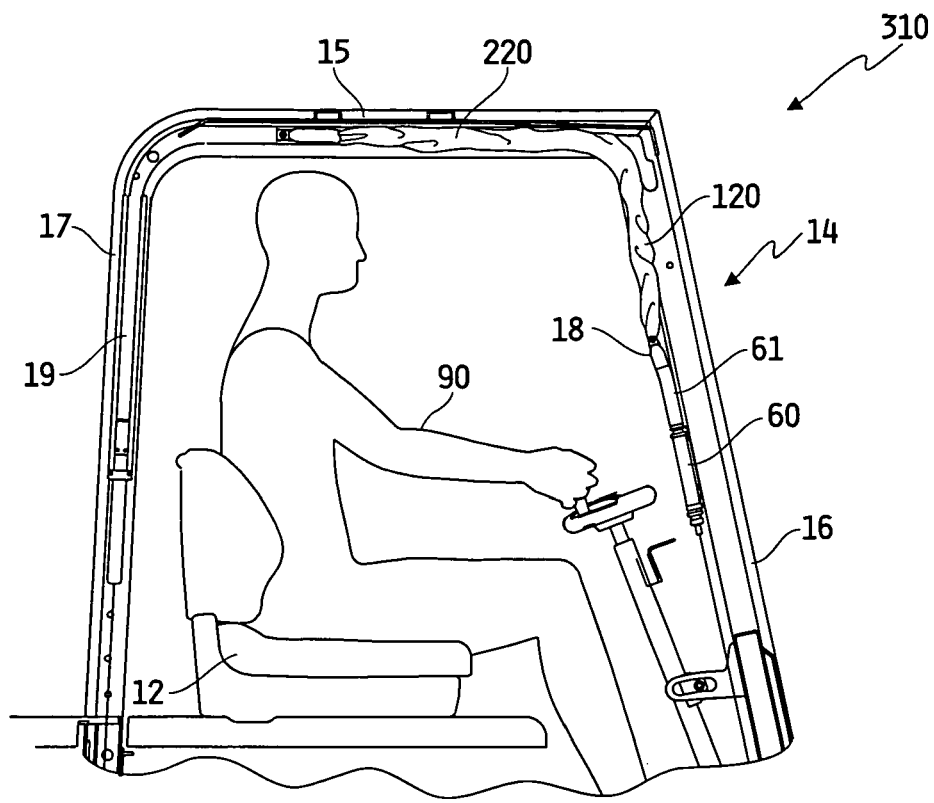
FIG. 6 shows a partial side view of any of the safety systems shown in FIGS. 3 and 5 in an illustrative stowed condition.
Figure 9:
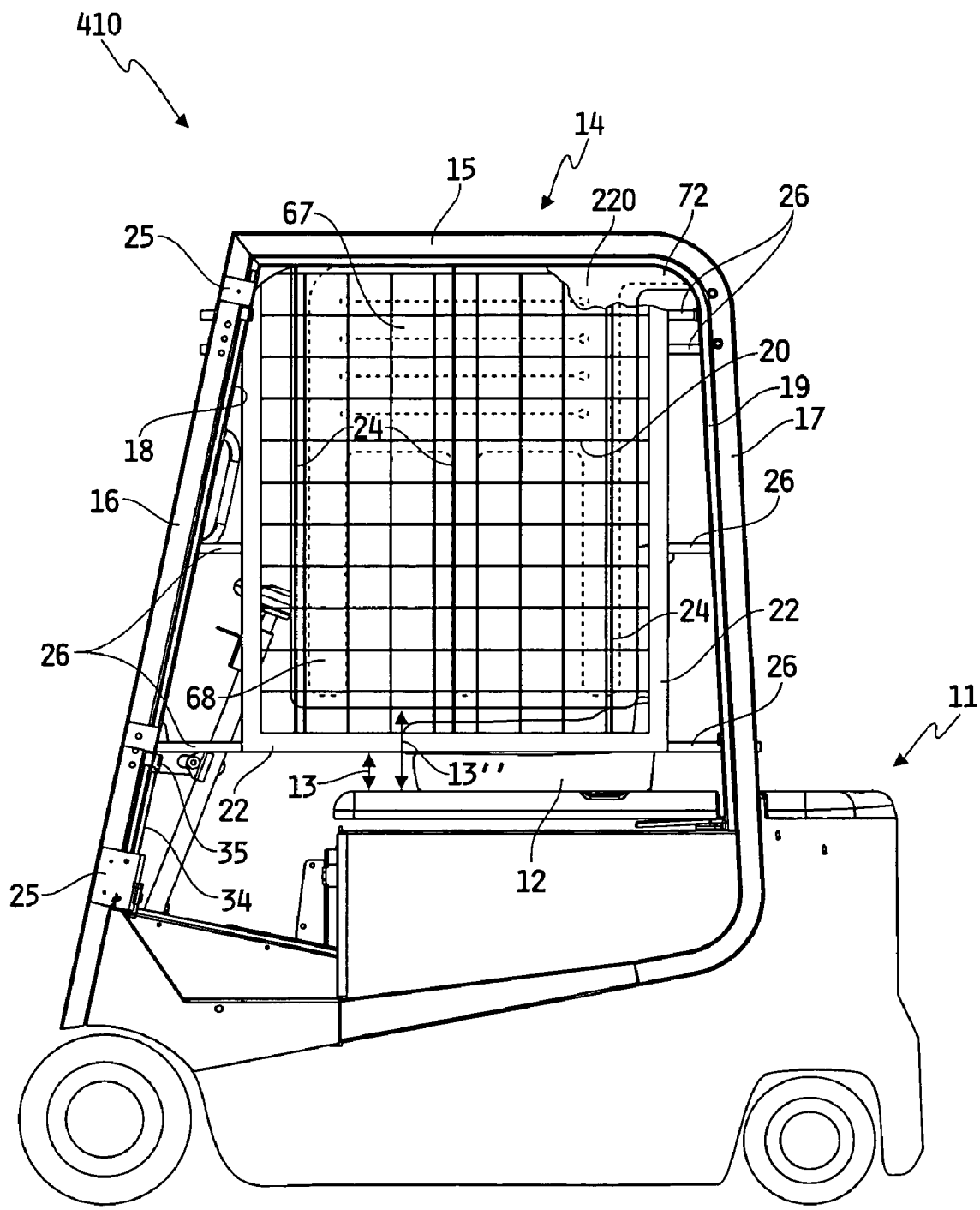
FIG. 9 shows a side view of a vehicle equipped with an illustrative embodiment of a passive safety system in a deployed position in combination with an active safety system also shown in a deployed position.

In lieu of, or in combination with any passive safety barrier 20, an active or reactive safety barrier or barriers similarly may be used to impede or even prevent occupant 90 egress. FIGS. 3–5 and 9 illustrate various alternative embodiments of inflatable emergency, reactive, or active, vehicle safety systems 110, 210, 310, 410 comprising one or more active or reactive safety barriers 120, 220, 320. Referring to FIGS. 3 and 6, another illustrative vehicle safety system 110 is depicted. Vehicle safety system 110 comprises an inflatable barrier or tube 120 and illustratively an associated shield 121. Tube 120 further comprises pivot mounts 28 which are configured to interact with previously described guide tracks 18, 19 such that when the tube 120 is inflated, as will be described below, the mounts 28 may travel down guide slots (not shown) in the tracks 18, 19. Referring to FIG. 4, illustrative vehicle safety system 210 comprises an inflatable barrier or curtain 220, which illustratively comprises generally horizontal bladders 67 and generally vertical bladders 68, and further comprises tethers 26'. When the curtain 220 inflates, as will be described below, the tethers 26' interact with guide tracks 18, 19 to guide the curtain 220 to the proper deployed position. Referring now to FIGS. 5 and 6, another illustrative vehicle safety system 310 is depicted. Vehicle safety system 310 is a combination of previously described safety systems 110 and 210 and therefore comprises both inflatable barriers 120, 220 and their associated components, including for example inflator 60 in fluid communication with the tube 120 through fill tube 61 and gas inlet 72, pivot mounts 28 and tethers 26 (not shown), each configured to interact with tracks 18, 19. Depicted in FIG. 9 is another illustrative vehicle safety system 410. Illustrative safety system 410 is a combination of previously described safety systems 10 and 210 and therefore comprises passive barrier(s) 20 and reactive barrier 220 in combination. Those skilled in the art will realize that passive barrier(s) 20 may similarly be combined with reactive barriers 120 and a combination of reactive barriers 120 and 220 as shown for example in vehicle system 310 as shown in FIG. 5.

Tube 120 (FIG. 3) and curtain 220 (FIGS. 4, 5, 9) are each illustratively mounted to top rail 15 by any suitable means such as, for example and without limitation, by adhesive, cement, rivets, tacking, screws, nuts and bolts, and the like. In normal operation, tube 120 and/or curtain 220 are in the fully retracted and stowed position similar to the stowed positions depicted in FIGS. 6 and 7. It will be appreciated that in the fully stowed position, all or a portion of the respective barrier, e.g., tube 120 and shield 121 and/or curtain 220, directly may be mounted to one or both of the supports 16, 17, as well as, or in lieu of, being mounted to top rail 15. Also, the inflatable barriers 120, 220 and inflator(s) 60 may be contained in either a hard plastic or soft textile cover system, which would open during deployment.

Safety systems 110, 210, 310, 410 further comprise control system 130, which operates substantially as described above in conjunction with system 10, and as will now be expanded upon in conjunction with inflatable barriers 120, 220. In operation, the sensor assembly 160 of control system 130 senses one or more parameters to determine if the vehicle 11 has reached a defined state or condition, such as roll or tip-over condition in the manner described above by comparing values, for example vehicle roll angle and rate to threshold values tailorable to specific vehicles and situations, and as for example described in the '455 patent. The sensor assembly then sends a signal 152 to actuate the inflator 60 in response in order to inflate the tube 120, the curtain 220, or both 310. Examples of suitable inflation devices are disclosed in U.S. Pat. No. 5,322,322 to Bark et al., and in U.S. Pat. No. 5,480,181 also to Bark et al., each of the disclosures of which are now incorporated herein by reference. Other conventional inflation devices may be used as well. A signal 156 may be sent to an output warning device as well.

When the tube 120 and curtain 220 are in the stowed position, the tube 120 and the horizontal and vertical bladders 67, 68 are substantially devoid of fluid so that the exit of the vehicle 11 is substantially uncovered by the tube 120 and/or curtain 220, thereby allowing an occupant to enter or egress the through the exit substantially unimpeded by the tube 120 and/or the curtain 220. In contrast, the act of inflation substantially fills the bladders 67, 68, 120 with fluid, thereby deploying or moving to the deployed position the tube 120 and shield 121 and/or curtain 220, or both 310 illustratively with the mounts 28 and/or tethers 26 traveling down guide slots (not shown) in the tracks 18, 19. After inflation and deployment of the tube 120 and/or the curtain 220 to the deployed position, at least a portion of the exit of the vehicle is covered in order to impede the occupant's egress through the exit. In the case of passive/reactive safety system 410, the passive barrier 20 provides the reaction surface to guide the reactive barrier curtain 220, or the tube 120, or the combination tube 120 and curtain 220 of system 310, thereby obviating the need for the reactive barrier 120, 220 to be configured with any tethers 26 at all (FIG. 9); although, tethers 26 or any other guide system may be used if desired. Both the tube 120 and/or the curtain 220 inflate(s) rapidly and may be, for example, unvented, allowing them to remain inflated long enough to contain the occupant 90 within the cab as defined by the FOPS and the deployed reactive barriers, for example tube 120 and shield 121 and/or curtain 220. In addition, to providing containment, the inflated tube 120 and/or curtain 220 may, but need not also cushion the occupant. In system 110, because it is desirable for deployment of the tube 120 to extend downwardly toward the seat 12 in order to prevent ejection or egress, it may be desirable to include another tube 120, to provide additional cushioning for the occupant's head. Such additional cushioning is already provided by the curtain 220 in systems 210, 310 and 410.

During inflation, the tube 120 rapidly expands in diameter and shortens in length to provide a tension barrier which, along with the shield 121, prevents egress or ejection of the occupant 90. Curtain 220 similarly expands and shortens to provide a tension barrier, as does the combination tube 120 and curtain 220 of system 310. Illustratively, the inflatable barrier 120, 220 may inflate in about 100 msec and may remain inflated for about 10 seconds.

It will be appreciated that any of the inflatable safety systems 110, 210, 310, 410 may be deployed laterally between the supports 16, 17 or upwardly from the bottom of vehicle 11, and mounted accordingly as described with the alternative passive barrier 20 mountings and as is within the knowledge of those skilled in the art. It will further be appreciated that in addition to the configurations described above, any one of safety systems 10, 110, 210, 310, and 410 may be used in combination with any one of the other safety systems 10, 110, 210, 310, and 410 and may be configured for employment in a number of different types of vehicles above and beyond the illustrative lift truck vehicle 11.

In addition to the examples described above, the following examples are illustrative but not exclusive. It will be appreciated, as described above, that in the below examples, while one barrier may itself impede egress, or two or more barriers may be mounted on any one side of a vehicle with the barriers moving toward each other (e.g., one moving upward and the other moving downward, or one moving laterally from one side toward the other one moving the opposite direction from the opposite side) to impede egress. Now for the non-exclusive examples. Any given vehicle 11 may have one or more passive barriers such as a net 20 on one or on each side of the vehicle. Any given vehicle 11 may have one or more passive barrier(s) 20 on one side in combination with one or more reactive barrier(s) such as for example tube 120, curtain 220, or combination tube 120 and curtain 220 on that same side. Any given vehicle 11 may have a passive barrier(s) 20 on one side and one or more reactive barrier such as for example tube(s) 120, curtain(s) 220, or combination tube(s) 120 and curtain(s) 220 on the other side of the vehicle 11. Any given vehicle may have both (1) a passive barrier or barriers 20 in combination with one or more reactive barrier such as for example tube(s) 120, curtain(s) 220, or combination tube(s) 120 and curtain(s) 220 on one side, and (2) one or more reactive barrier such as for example tube(s) 120, curtain(s) 220, or combination tube(s) 120 and curtain(s) 220 on the other side of the vehicle 11. Any given vehicle may have both (1) a passive barrier 20 in combination with a reactive tube 120, curtain 220, or combination tube 120 and curtain 220 on one side, and (2) another passive net or nets 20 in combination with one or more reactive barrier such as for example tube(s) 120, curtain(s) 220, or combination tube(s) 120 and curtain(s) 220 on the other side of the vehicle 11. It will be appreciated, as noted above, that the above illustrative examples may further be varied in the way the systems 10, 110, 210, 310 and 410 are mounted on the vehicle. For example the barriers 20, 120, 220, 320 could deploy from top rail 15 downwardly, could deploy from the bottom of the vehicle 11 upwardly, or could deploy laterally between the supports 16, 17. In the alternative, the passive barrier 20 could be mounted and deployed horizontally and the reactive barriers 120, 220, 320 could be mounted and deployed vertically or vice versa. Also, as noted above, a single barrier 20, 120, 220, 320 could be replaced by two or more barriers 20, 120, 220, 320 of the same type but which move toward each other in opposing directions, whether that be laterally or vertically, or obliquely, similar to eyelids, to form an egress barrier.

Although the invention has been described in detail with reference to certain embodiments, it should be understood that the invention is not limited to the disclosed embodiments. Rather, the present invention covers variations, modifications and equivalent structures that exist within the scope and spirit of the invention and such are desired to be protected.

The invention claimed is:

1. A vehicle safety system for impeding the egress of an occupant of a vehicle, the safety system comprising:
   a first safety barrier mounted to a vehicle having a cab with an open exit, the open exit extending generally from a bottom region of the cab to a top of the vehicle, the first safety barrier comprising:
      a first stowed position wherein the open exit of the vehicle is substantially uncovered by the first safety barrier such that an occupant of the vehicle may egress through the exit substantially unimpeded by the first safety barrier,
      a first deployed position wherein the first safety barrier covers at least a portion of the open exit in order to impede the occupant's egress through the exit
   a control system; and
   a reactive safety barrier mounted to the vehicle, the reactive barrier comprising
      a second stowed position that leaves the exit of the vehicle substantially uncovered by the reactive barrier and
      a second deployed position that covers at least a portion of the exit in order to impede the occupant's egress through the exit,
   wherein the control system deploys the reactive barrier from the second stowed position to the second deployed position in response to the occurrence of a defined event.

2. The vehicle safety system of claim 1, wherein the reactive barrier comprises an inflatable barrier.

3. The vehicle safety system of claim 2, wherein the inflatable barrier comprises a curtain.

4. A vehicle safety system for impeding the egress of an occupant of a vehicle, the safety system comprising:
   a safety barrier mounted to a vehicle having a cab with an open exit, the open exit extending generally from a bottom region of the cab to a top of the vehicle, the barrier comprising:
      a stowed position wherein the open exit of the vehicle is substantially uncovered by the safety barrier such that an occupant of the vehicle may egress through the exit substantially unimpeded by the safety barrier; and
      a deployed position wherein the safety barrier covers at least a portion of the open exit in order to impede the occupant's egress through the exit; and
   a control system,
   wherein the control system deploys the safety barrier from the stowed position to the deployed position in response to the occurrence of a defined event.

5. The vehicle safety system of claim 4, wherein the safety barrier comprises an inflatable barrier.

6. The vehicle safety system of claim 5, wherein the inflatable barrier comprises a curtain.

7. The vehicle safety system of claim 5, further comprising an inflator in fluid communication with the barrier, and wherein the control system signals the inflator to inject fluid into the barrier in order to move the inflatable barrier from the stowed position to the deployed position upon the occurrence of the defined event.

8. The vehicle safety system of claim 7, wherein the control system comprises one or more sensors configured to detect the defined event.

9. The vehicle safety system of claim 8, wherein the one or more sensors comprises a roll sensor.

10. A vehicle safety system comprising:
    a vehicle comprising
       a cab having an open exit generally defined by a top member connected to a pair of spaced apart side members, the open exit extending generally from the top member to a bottom region of the cab,
    a first safety barrier mounted to the exit, the barrier comprising
       a first stowed position wherein the exit of the vehicle is substantially uncovered such that an occupant of the vehicle may egress through the exit substantially unimpeded by any structure, and
       a first deployed position wherein the first safety barrier covers at least a portion of the exit in order to impede the occupant's egress through the exit
    a motor mounted to the vehicle and configured to move the safety barrier between the first stowed position and the first deployed position,
    a retractor mounted to the vehicle and configured to move the safety barrier between the first stowed position and the first deployed position, and
    a control system configured to command the movement of the safety barrier between the first stowed position and the first deployed position in response to the occurrence of a defined event.

11. The vehicle safety system of claim 10 further comprising:
    a second safety barrier mounted to the exit, the second safety barrier comprising
       a second stowed position wherein the exit of the vehicle is substantially uncovered by the second safety barrier such that an occupant of the vehicle may egress through the exit substantially unimpeded by the second safety barrier, and a second deployed position wherein the second safety barrier covers at least a portion of the exit in order to impede the occupant's egress through the exit, and wherein the second safety barrier is configured for continuous deployment in the second deployed position during the operation of the vehicle.

12. A vehicle safety system comprising:

a vehicle comprising an open exit generally defined by a top member connected to a pair of spaced apart side members, the open exit extending generally from the top member to a bottom of the vehicle, a safety barrier mounted to the exit, the safety barrier comprising one or more generally horizontal bladders, one or more generally vertical bladders, a stowed position wherein the horizontal and vertical bladders are substantially devoid of fluid so that the exit of the vehicle is substantially uncovered such that an occupant of the vehicle may egress through the exit substantially unimpeded any structure, and a deployed position wherein the horizontal and vertical bladders are substantially full of fluid so that the safety barrier covers at least a portion of the exit in order to impede the occupant's egress through the exit, and a control system configured to move the safety barrier from the stowed position to the deployed position upon the occurrence of a defined event.

* * * * *